June 21, 1927.
J. S. KENNEDY
1,632,905
SYSTEM FOR AUTOMATIC VALVE CONTROL
Original Filed Dec. 21, 1921    6 Sheets-Sheet 2
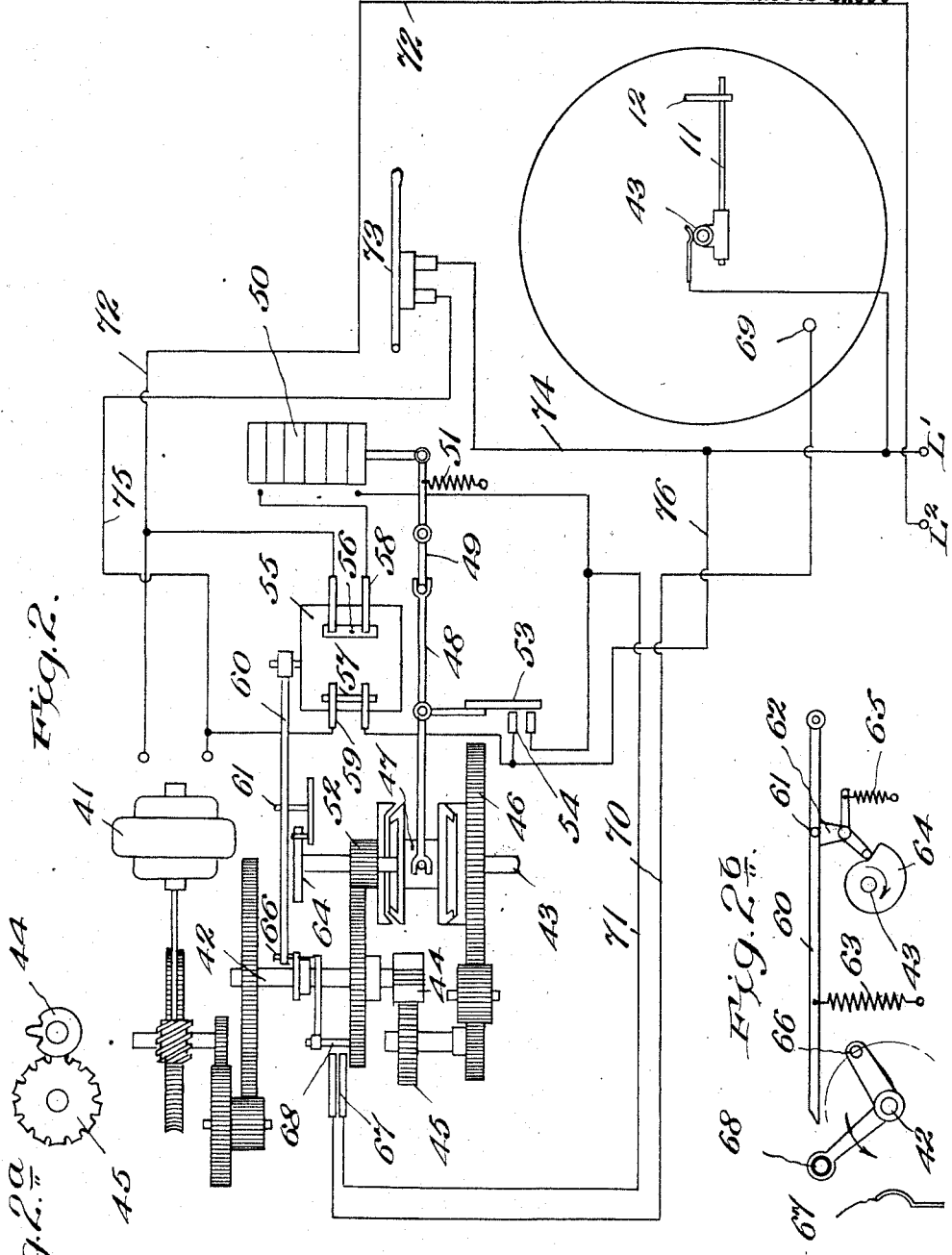

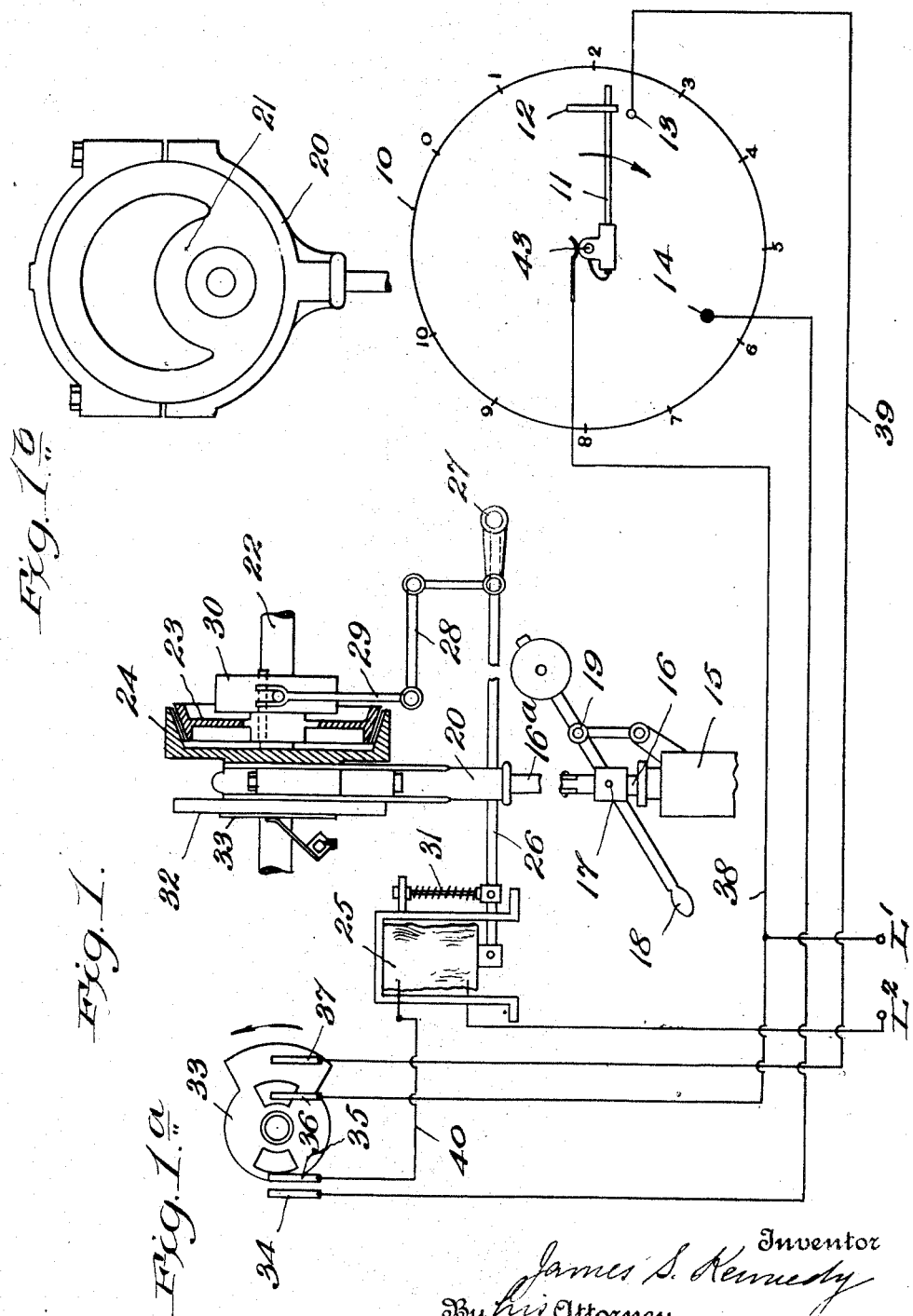

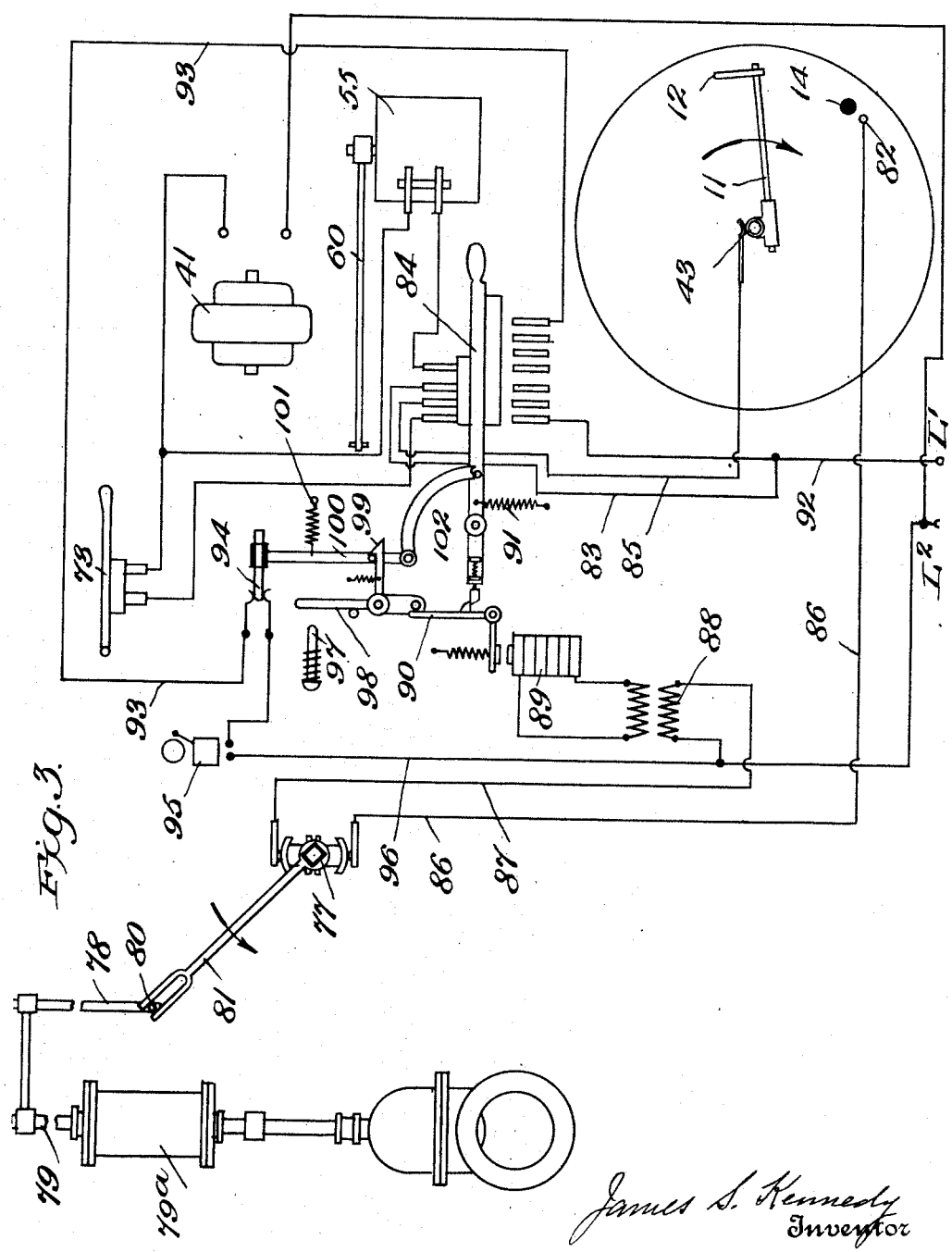

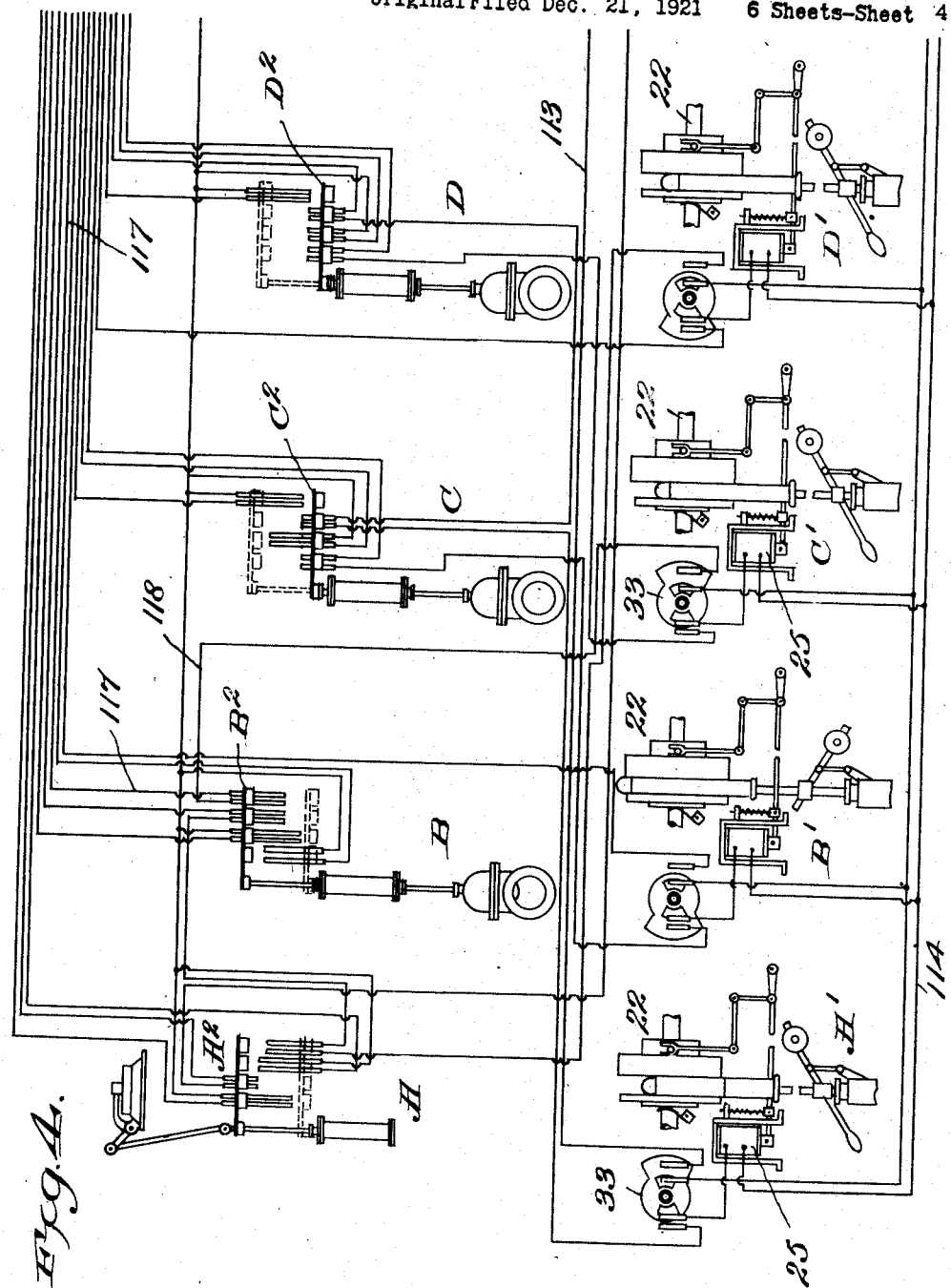

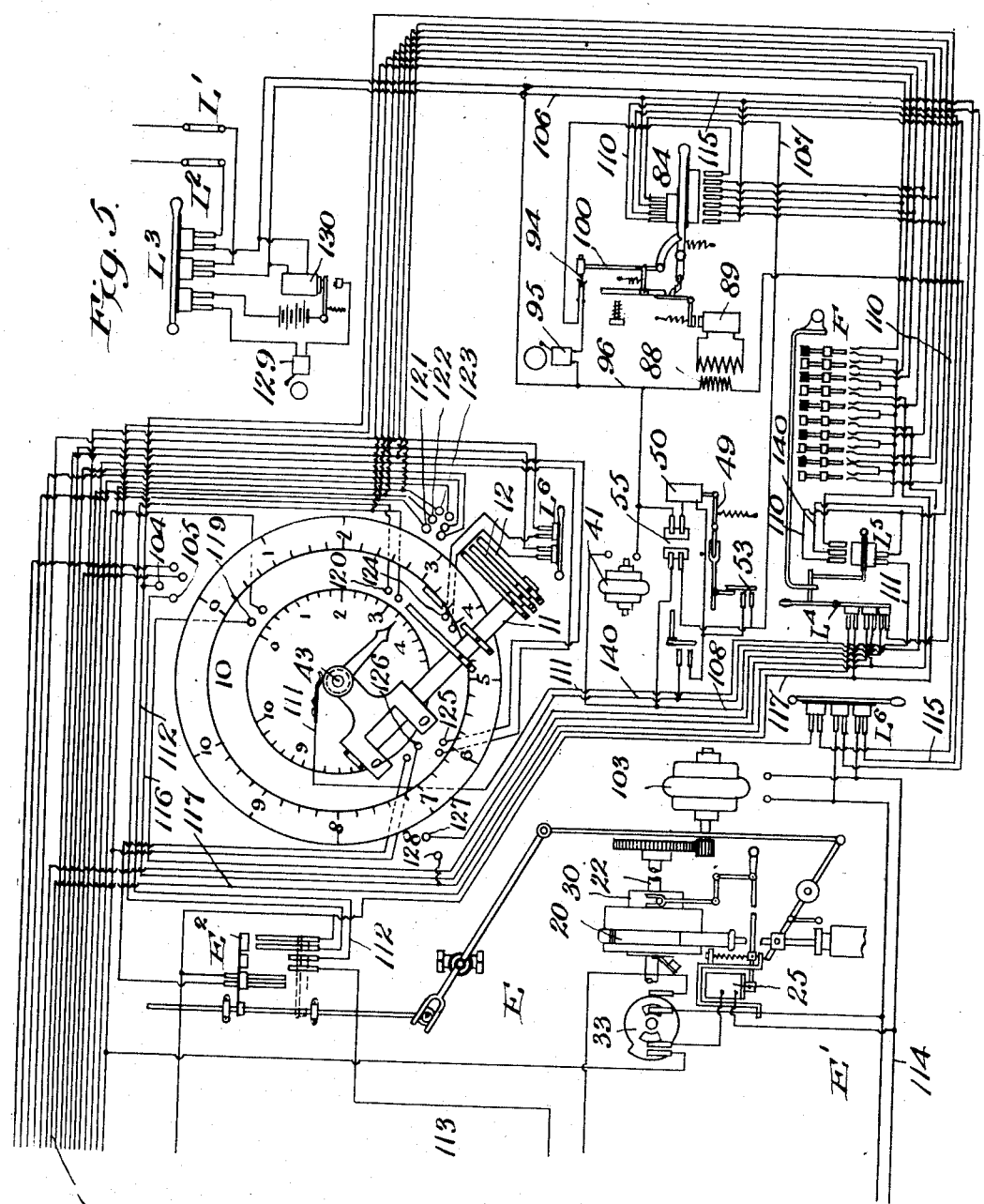

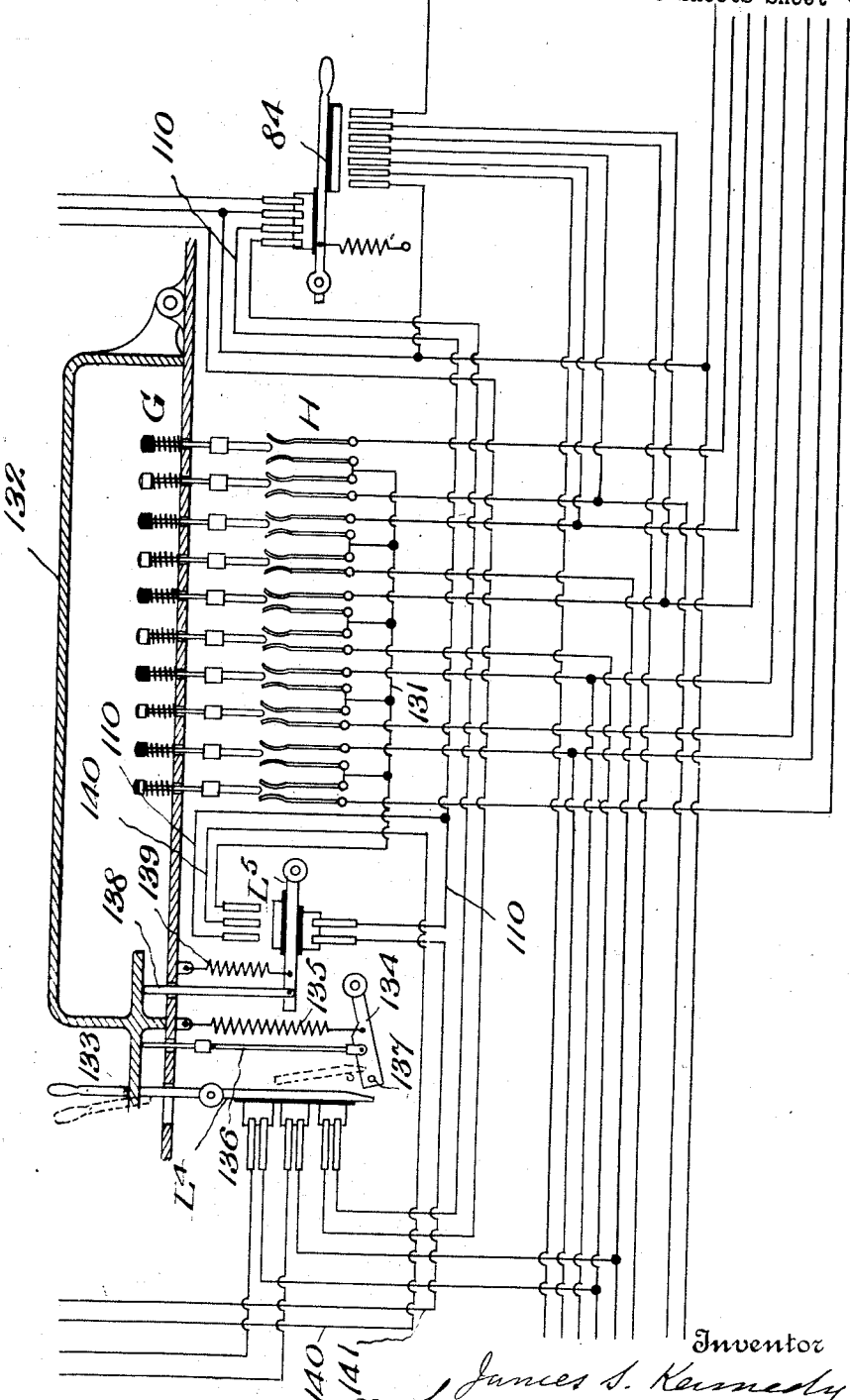

Patented June 21, 1927.

1,632,905

UNITED STATES PATENT OFFICE.

JAMES S. KENNEDY, OF YONKERS, NEW YORK, ASSIGNOR TO THE BARTLETT HAYWARD COMPANY, A CORPORATION OF MARYLAND.

SYSTEM FOR AUTOMATIC VALVE CONTROL.

Original application filed December 21, 1921, Serial No. 524,038. Divided and this application filed January 4, 1923. Serial No. 610,729.

The present invention has relation to a new and improved electrical system of valve control, useful in connection with any apparatus automatically operated by means of valves. The subject matter of this invention is more particularly useful in connection with an automatically operated and controlled gas producer set. I have described and claimed such a set in my pending application for United States Letters Patent, Serial Number 524,038, filed December 21st, 1921, of which this is a division. Since the system herein claimed is best exemplified in its application to the operation of an automatic gas set, it is so described hereinafter, but without any intention of limiting the claims to this application of the invention.

As is well known, the making of carburetted water gas involves a cycle of operations, comprising generally a series of alternate "blows" and "runs". During the "runs", the basic gas is being formed by the passage of steam through a mass of incandescent fuel, by which it is decomposed. During the "blows" air is being forced through the fuel mass to restore the temperature lost during the decomposition of the steam.

Besides the valves controlling passages of the air and steam, it is necessary to operate in proper sequence the stack cap, the oil admission for enrichment of the basic gas in the carburetter and the mutually connected upper and lower "hot valves" which determine the direction (up or down) of flow through the fuel.

The total length of time occupied by a complete cycle of operation will vary with variations in a number of conditions; and such variations will also determine the proportions of the total time occupied by each "blow" and "run", as well as the proper moment for admitting and cutting off oil and for reversing the direction of the flow of steam by moving the "hot valves." The determination of these various factors is the function of a gas engineer, and, where all of the successive and inter-related valve movements are accomplished manually, the closest supervision of labor is rendered necessary. Indeed it is virtually impossible to insure perfect compliance at all times with the rules for operation laid down by the engineer. Besides this, careless operation sometimes causes accidents which are dangerous to life and property.

The present invention supplies means capable among other things of easy application to existing types of water gas sets or plants, whereby all of the complicated operations above mentioned may be automatically controlled and timed with complete certainty and entire accuracy. The utmost flexibility of operation is possible, so that the order of operations and the time occupied by each is capable of quick and easy determination by an engineer, who merely has to set the mechanism for the particular operation deemed necessary at any time. Once set, the device can be relied upon to bring about a succession of cycles of the desired character, without possibility of mistake or accident. In its preferred form, my system involves a complete interlocking, whereby no particular operation can be carried out without the previous occurrence of such other operations as should properly anticipate it.

Other novel and advantageous features of the invention will appear hereinafter.

A preferred embodiment of the invention is illustrated in the accompanying drawings, wherein Figures 1, 1ª and 1ᵇ are diagrams showing the relation of the controller proper to the apparatus for opening and closing the various master valves, Figures 2, 2ª and 2ᵇ are related diagrams showing the controller and its driving means, Figure 3 is a similar diagram illustrating the relation of the controller to the safety means, whereby the emergency switch trip is operated in case of accident, Figures 4 and 5 are successive parts of a total diagram, showing the operating means for an entire system and Figure 6 is a diagram on a larger scale showing the preferred means for manual operation of the valves.

As several of the valves which have to be moved in the operation of water gas sets, particularly in sets of large size, are very heavy, it is now the practice to employ hydraulic power to move such valves. The hydraulic cylinders or engines which supply this motive power are controlled by master valves conveniently grouped, and, in my preferred apparatus the controller is employed to control the motive means for said master valves. One preferred means whereby a master valve is thus controlled is shown in diagram in Figure 1; it being understood that the description applies to all the master valves used in my system.

In Figure 1, the front of the controller (driven preferably as hereinafter described) is shown at the right. The circular dial 10 is numbered at equal intervals around its circumference from 0 to 10, these intervals preferably representing ten minutes of time, a period longer than the total period of "blow" and run or "cycle" which is likely to be used.

The finger 11 is moved intermittently clockwise around the dial 10 at a constant speed making the total circuit in ten minutes; and it carries a contacting member 12 which can be brought into electrical contact with successive stationary members 13 and 14, which are capable of being moved, in any well known manner, along the same circular path, so that contact with the member 12 will take place at any particular time desired. For convenience an open circle (as 13) will indicate a stationary adjustable contact member used for opening a valve, while a filled or black circle (as 14) indicates a member used for closing a valve. As will be described in connection with Figures 4 and 5 the plurality of instrumentalities for operating a gas set is controlled from one controller, by using stationary adjustable contact members in separate concentric circles, each circle corresponding to a single instrumentality. This arrangement is preferred, but is not, of course, essential.

In Figure 1, a hydraulic master valve is indicated at 15. The moving part of the valve is, as usual, operated by the rod 16, pivoted at 17 to the handle 18, which is in turn pivoted at 19. This is for hand operation.

The preferred means for automatic operation of each valve comprise the following elements. The upper end of each operating rod 16 is pivotally connected, through the connecting rod 16ª, with the lower half of the eccentric strap 20, within which is closely fitted the eccentric disk 21. This disk is eccentrically and loosely mounted upon the shaft 22, which is continuously rotated by the motor hereinafter referred to in connection with Figures 4 and 5.

A clutch member 23 is slidably mounted on the shaft 22 and is keyed thereto, so as always to turn with it. When forced to the left in Figure 1 in the manner described hereinafter, the member 23 makes frictional engagement with the clutch disk 24, which is fixed to the disk 21, thus causing this latter to revolve with the shaft 22. By causing successive engagements of the clutch members of suitable duration, the disk 21 can be rotated through 180 degrees at a time, thereby causing successive up and down movements of the operating rod 16, and so opening and closing the valve 15.

These periodical engagements and disengagements of the clutch members are preferably accomplished by an electro-magnetic solenoid 25 which, when energized, lifts a lever 26 fulcrumed at 27. This acts through the bell crank lever 28 and the usual forks 29 and collar 30 to move the clutch member 23 in a well known manner. Disengagement of the clutch is accomplished by the spring 31, when the solenoid is de-energized.

In order that the rotation of the disk 21 may be limited to 180 degrees at each operation, there is fixed to one face of the disk a fiber disk 32 which bears a conducting plate shown in Figure 1ª at 33. This plate has an enlargement and is furnished with segment shaped openings, as shown, in order to cooperate as described hereinafter with the four contact brushes 34, 35, 36 and 37, to control the movements of the solenoid 25 and therefore of the disk 21.

Supposing the valve 15 to be closed, and that it is desired that it shall open when the intermittently moving brush 12 reaches the contact 13. In this position brushes 35 and 37 make contact with the plates 33 (Fig. 1ª) while the brush 34 being outside the edge of the plate and the brush 36 being over an aperture in the same, these brushes are not in circuit.

As soon as the brush 12 touches the terminal 13, circuit will be closed from the main terminal L' by wire 38 to the finger 11 and brush 12, terminal 13, wire 39, brush 37, plate 33, brush 35, wire 40 and solenoid 25, to the other main terminal L². This causes the disk 21 to revolve, and with it the plate 33, thus bringing the brush 36 very soon into contact with the plate 33, and short-circuiting the controller 10, and insuring continuance of rotation of the disk 21 through 180 degrees, at the end of which movement the brush 36 comes over the second opening in the plate, and, as the brush 37 has left the enlargement on the plate 33, the circuit through the solenoid is definitely and finally broken. This permits disengagement of the clutch, and the disk 21 stops turning. At the end of this movement, however, the enlargement on the plate 33 has come under the brush 34, and the solenoid will be again energized (to close the valve) when the brush 12 touches the terminal 14.

The apparatus for actuating the controller proper is shown in Figures 2, 2ª, 2ᵇ. The motive force may be supplied by any constant speed motor, preferably an electric motor as indicated at 41. This motor, by appropriate gearing as shown, drives the shaft 42 continuously, and at a relatively high speed. The shaft 43, upon which is mounted the controller finger 11, is normally driven intermittently from the shaft 42. This is preferably accomplished by means of the one-toothed gear 44 on the shaft 42, cooperating with the pinion 45. In practice, the motor 41 is so timed that the tooth on 44 becomes operative once every fifteen seconds; although the particular period of time is, of course, not essential.

Through appropriate gearing, as shown, each revolution of the shaft 42 causes the spur gear 46 to make one fiftieth of a revolution and this gear is mounted loosely on the shaft 43. In normal operation each movement of the spur gear 46 causes the shaft 43 to move the finger 11 through one quarter minute space, and forty of these movements carry the finger from the zero position at the top of the dial in Figure 1 to the ten minute position shown in that figure. This arrangement is adapted to cycles of blow and run occupying ten minutes or less. Of course the system can be adapted to other total time intervals by obvious means, A double-faced clutch 47 is keyed to and slidably mounted upon the shaft 43, and this clutch is controlled by the pivoted levers 48 and 49, actuated in one direction by the solenoid 50 and in the other direction by the spring 51. This spring normally holds one face of the friction clutch 47 in operative contact with the corresponding clutch member on one face of the gear 46, as shown. In consequence, so long as this normal position is preserved, each forward intermittent movement of the gear 46 produces a movement forward of the finger 11.

On the opposite side of the clutch 47, the shaft 43 carries a loosely mounted pinion 52, which is geared to the shaft 42, as shown, in a manner to produce a relatively rapid angular velocity in said pinion. When the solenoid 50 is energized it operates through the levers 49 and 48 to cause engagement of the clutch 47 with a clutch member on the pinion 52, and the shaft 43 is thereby caused to revolve rapidly forward clockwise. The lever 48 carries an insulated bar 53, which closes the switch 54, when the solenoid is actuated, for a purpose described hereinafter.

A revoluble drum switch, shown developed upon a plane at 55 in Figure 2, carries on its insulating surface two metal plates 56, 57, which are adapted to close circuits respectively across the pairs of terminals 58 and 59. This drum turns with a supporting shaft upon which is also fixed the lever 60 normally supported by a pin 61 resting on one of the arms of a three-armed lever 62 (see Figure 2$^b$). The spring 63 acts to depress the lever 60 with a quick snappy movement whenever the support at 62 is withdrawn, thereby producing a sudden break of circuit at 56 and 57.

The dropping of the lever 60 is accomplished by a cam 64 fixed to the shaft 43, and so related to the finger 11 of the controller that, just as said finger reaches the zero position, the support for the pin 61 is withdrawn, thus breaking circuits at 56 and 57. Immediately afterward the cam 64 permits the spring 65 to act to restore the lever 62 to the position shown in Figure 2$^b$. This return to normal is permitted by the lifting of the lever 60 by means of a pin 66 on the arm carried by the shaft 42 (revolving anti-clockwise as shown by the arrow in Figure 2$^b$) which pin lifts the tip of the lever 60, permitting the spring 65 to bring the supporting lever 62 under the pin 61.

In order that the energizing circuit of the solenoid 50 may be closed at a time when the pin 66 is in proper relation with the bar 60, the solenoid circuit includes a pair of terminals 67 which are bridged by the insulated metal pin 68, on an arm carried by the shaft 42, a few moments after the lever 60 has been lifted. All of these operations are carried on at relatively high speed, and well within the fifteen second period between normal movements of the finger 11.

In order that the finger 11 of the controller may be ready to start from zero at the end of the fifteen second period which concludes a given cycle, and so that this may be done whatever the total time (within the maximum limit) occupied by the complete cycle of blow and run, a special "end of run contact" 69 is provided, the position of which on the controller dial is adjustable in any well known manner. This is so placed that, at the proper moment, the brush 12 makes contact with it, when the finger 11 will be promptly returned to zero within the next fifteen second period. This is accomplished as follows.

As soon as the brush 12 touches the "end of run" contact 69, a moment or two will elapse before the pin 68 closes circuit at 67, when the solenoid 50 will be energized by a circuit as follows: From main terminal L′ through the finger 11 and brush 12 to contact 69, by wire 70, switch 67, wire 71, solenoid 50, switch 56 and wire 72 to main terminal L².

Although this circuit will be almost instantly broken at 67, a branch circuit established at 54 by the action of the solenoid will preserve the circuit. The clutch 47 will at once cause the swiftly moving pinion 52 to drive the shaft 43, carrying the finger 11 forward, and, just as said finger reaches zero, the cam 64 will remove the support 62 from under the pin 61, thus opening the solenoid circuit at 56, and stopping the finger by movement of the clutch 47 back to the normal position shown in Figure 2. It will be seen that this return of the finger 11 to zero is accomplished well within the fifteen second period between normal movements of the finger, thus avoiding all waste of time.

It is, of course, sometimes desirable to shut down the apparatus and this should occur normally only at the end of a completed cycle. By use of the apparatus shown in Figure 2, the normal shut down switch may be opened at any time during a run or blow, and the shutting down will be postponed automatically to the end of the cycle.

The normal shut down switch 73 closes circuit to the motor 41, through wires 74, 75 and 72, but, so long as the drum switch 55 is in the position shown (which keeps the solenoid 50 prepared) the motor 41 will be supplied with current by a branch circuit including the wire 76 and the switch 57. Hence, on opening circuit at 73, the motor 41 will go on running until the lever 60 is dropped and the drum switch 55 is operated to de-energize the solenoid 50. As already explained, this only occurs at the end of a cycle.

Before referring to the complete organization shown in Figures 4 and 5, reference will be had to Figure 3, which illustrates the automatic and the manually operated emergency apparatus whereby the entire system can be at once placed in safe condition, in case of accident, without waiting for the end of the cycle.

Assuming that the hydraulic cylinder 79ª in Figure 3 operates (for instance) to open the carburetter valve, which by some accident fails to close when the brush 12 reaches its closing terminal 14. Each of the hydraulic cylinders is connected for interlocking purposes with a revoluble drum circuit-controller 77, the various arrangements of which are fully shown in diagram in Figures 4 and 5. In Figure 3 this circuit controller is shown in end view and only the contacts associated with the emergency shut down are shown. Circuit is closed at the switch 77 when the main valve is open, but as the valve closes, a rod 78, attached to the rod 79 moving with the valve, operates through a pin 80 on the forked lever 81 to open circuit at 77.

Associated with each operating contact (as 14) on the main controller is an emergency contact 82, so placed as to be touched by the brush 12 as soon as it leaves the corresponding contact 14. Consequently if the main valve intended to be closed when contact occurs at 14 should fail to operate, circuit will be closed at 82 to shut down the whole system, as follows.

From the terminal L' by wire 92 to the emergency switch 84, by wire 85 to finger 11, brush 12, contact 82, wire 86, switch 77, wire 87, the high voltage coils of a transformer 88, and back to terminal L². Current from the low tension side of the transformer will then energize the releasing magnet 89 which withdraws the latch 90 from the pivoted bar of the emergency switch, allowing the spring 91 to throw the switch down to close circuits through the lower stationary contacts shown in Figure 3. As will be seen from inspection of the circuits in Figures 4 and 5, this operation of the emergency switch will act to open the stack, if closed—close the generator and carburetter blast if open—open the upper hot valve if closed—and close the oil valve if open. This places the set in a safe condition until the trouble can be located and repaired.

Inasmuch as the circuit of the motor 41 that runs the controller proper is opened when the emergency switch is thrown, the finger 11 will stop in a position to indicate at once which valve has failed to work, and so locate the difficulty.

It is desirable that an alarm bell should be rung when the emergency switch is automatically thrown, and this is accomplished as follows: current from L' goes by wire 92 and wire 93 to switch 94 to a bell 95 and thence by wire 96 to the terminal L².

In order to permit instant shut down by manual operation, a spring-pressed rod 97 is used which, when pushed, swings the pivoted lever 98, thereby tripping the latch 90 and throwing the emergency switch. In order to prevent ringing of the alarm bell on manual shutting down, the lever 98 carries a hook 99 which normally holds the pivoted lever 100 in the position shown, thereby keeping the plug switch 94 closed. When this hook is depressed, however, on pushing the rod 97, the spring 101 draws the lever 100 to the right and opens the switch 94, thus opening the bell circuit. An extension 102 on the lever 100 is supported by the lever of the emergency switch, so that the lever 100 will be reset when the lever 84 is reset by hand.

For the sake of clearness, certain parts of the total system of circuits used in practice have been isolated in the foregoing description, and these are sufficient for the normal operation of a practical system, assuming that no accidents occur. In actual operation, of course, accidental failure of operation in one member or another of the entire system must be foreseen and provided for. In some cases, such a failure of operation would result in serious damage and even possible loss of life, and, for this reason, I prefer to make what may be termed an "interlocking" system, whereby accidents of this kind are automatically and certainly prevented. Such a system is shown in Figures 4 and 5, which should be placed end to end with Figure 5 on the right hand.

The controller dial and pointer hitherto described has been reduced to its simplest terms, in its relation to control of a single valve. As shown in Figure 5, however, this element is shown in complete form as used in actual practice in the control of a gas set. Here the finger 11 carries a brush 12 comprising five springs moving over as many concentric circles. In each of these circles is shown a series of adjustable stationary contacts corresponding to the typical contacts shown at 13 and 14 in Figure 1. Each operating contact is shown accompanied by an emergency stop contact corresponding to that shown at 82 in Figure 3.

In order to make the present invention clear with relation to the complete set, including the interlocking feature, it will only be necessary to follow in detail one operation. Figures 4 and 5 show the detailed circuits for carrying out all the operations in their interlocked relation as hereinafter set forth.

The various valves with their interlocking switches are shown as follows in Figures 4 and 5. The stack operator is shown at A; the upper hot valve at B; the generator blast at C; the carburetter blast at D; and the oil valve at E. It is to be understood that the steam valve is automatically opened and closed by the respective closing and opening of the stack. This is the usual arrangement in these sets and is not herein shown. Also the upper and lower "hot valves" are connected in the usual manner, so that when either is closed the other is opened. The automatic actuating means for the elements shown at A to E are respectively indicated at A′, B′, etc. Their operation has been described in connection with Figures 1, 1ª and 1ᵇ. The common shaft 22 for actuating all of these is driven by the electric motor 103.

Referring now to one example of operation, let us suppose the finger 11 to stand at zero, at the beginning of a cycle, with the movable contacts 12 touching the stationary contacts 104 and 105. The circuit through 104 may be traced as follows: from terminal L′ through the switch L³ by wire 106 to switch 84, by wire 107 to switch 65, by wire 108 to switch L⁴ (hereinafter described) by wire 109 to switch 84, by wire 110 to switch L⁵ (hereinafter described), by wire 111 to the finger 11, brush 12, contact 104, wire 112, interlocking switch at E (closed when the oil valve is closed) wire 113, to plate 33 at A′ (the stack) solenoid 25 at A′ wire 114, switch L⁶, wire 115, and switch L³ to L². This opens the stack as already described with relation to Figure 1.

At the same time the current from L′, reaching the finger 11, passes by contact 105, wire 116, switch L⁴ wire 117, interlocking switch at B (when valve is open as shown) by wire 118 to plate 33 at C′, solenoid 25 at C′, and by wire 114 as before to switch L³ and terminal L². This circuit opens the generator blast valve.

By following the circuits shown in Figures 4 and 5, it will be seen that the following operations follow in order as the springs 12 successively reach the contacts about to be named.

The stack and generator blast having been opened at 104 and 105 as above described, contact is made at 119, which acts to open the carburetter blast valve. These remain open during the "blow", together with the upper hot valve which was left open after the previous cycle of blow and run. This "blow" lasts until the contacts 12 touch the fixed terminals 120, 121, 122, 123 when the following operations take place.

Current through 121 closes the carburetter blast valve; through 122 closes the generator blast valve; through 123 closes the stack. These operations inaugurate the "run". It is this condition which is illustrated in Figures 4 and 5. The order of these operations is determined by the interlocking switches.

When the brush 12 reaches 124 a circuit is closed which closes the upper hot valve, thereby automatically opening the lower valve and reversing the direction of flow through the fuel. This condition continues until the terminal 125 is reached, when the circuit thus established reopens the upper hot valve.

The circuit established upon making contact at 126 closes the oil valve, and when 127 is reached the resetting operation hitherto described with relation to Figure 2 takes place. This returns the finger 11 to zero for a new cycle.

If desired a contact 128 may be provided as shown, whereby the generator blast is opened when the resetting contact is made. This affords a few moments of "purging" before the stack is opened, thus saving gas. For this purpose 128 is directly connected with 105, as shown.

For interlocking purposes, and to prevent accidental disturbance of the proper order of operations, each valve A, B, C, D, E is is provided with a proper drum controller or switch indicated in diagram in Figures 4 and 5 by the several groups of mutually insulated brushes shown at A², B², C², D² and E² moving over stationary conducting strips whose mutual relations are shown developed upon a plane, for greater clearness. It will be seen that, by using this system, the operation of a given member must be not only begun but completed before the next interlocked operation can take place.

By inspecting the circuits shown in the drawing, it will be seen that they are so interrelated through the switches at A², B², etc., that the following orders of operations are insured.

The oil valve must close before the stack opens—the stack must close before the oil valve opens—the hot valve must be opened before the generator blast valve will open—the hot valve and the stack must open before the carburetter blast valve will open—the generator blast valve and the carburetter blast valve must both close before the stack will close.

The main switch $L^3$ is associated with a "no voltage alarm" comprising a bell 129 which rings when current fails in the magnet 130, the coils of which are constantly in the main circuit. This is a well known device for making it known when there is an accidental failure of current. When this occurs, the engineer in charge can complete the cycle by manual operation of the hydraulic valves.

Occasions may arise when it may become desirable to carry the set through one or more cycles of operation involving time intervals not in accordance with the usual normal operation as established by the particular arrangement of fixed contacts existing in the controller 10. In order to be able to do this conveniently without having to disturb the normal condition of said controller, it is preferred to connect up with a system a special manual operator shown in its proper electric connection but on a small scale at F in Figure 5. This will now be described with reference to Figure 6 which shows the preferred construction in detail and on a larger scale.

This manual operator comprises a row of push buttons G, each cooperating in a well known manner with one of the pairs of spring contacts in the group shown at H to close its appropriate circuit. One spring in each pair is connected as shown with a common wire 131 leading to one side of the switch $L^5$. The remaining springs in the various pairs H are connected, as shown in Figure 5, to wires leading to the various operating groups A, B, C, etc. In other words, these springs correspond in the manual controller to the various fixed contacts in the automatic controller 10. The buttons are shown white and black alternately. The white buttons serve for opening the different valves and the black buttons for closing them. The first pair of buttons, starting at the left in Figures 5 and 6, controls the stack; the next pair controls the upper hot valve; the next the generator blast valve; the next the carburetter blast valve; and the last pair controls the oil valve.

This apparatus is contained in a box furnished with a hinged cover 132, fastened in any desired manner, and, when closed, preventing access to the buttons G. In order to prevent both the automatic and the manual systems being available at the same time, the normal shut down switch takes the form shown at $L^4$, having its operating handle extending through a slot in the top of the box, and being furnished with a pin 133 which engages an extension on the cover 132. This locks the cover when the switch $L^4$ is closed. Within the box there is a pivoted bar 134 drawn upward by the spring 135, but depressed as shown when the cover 132 is closed by means of a rod 136 upon which the extension on the cover descends.

The switch $L^4$ having been thrown to shut down the automatic system, and the cover 132 being raised, the bar 134 moves upward until the pin 137, which it carries, comes behind the switch lever $L^4$ (see dotted lines in Figure 6). This prevents closure of this switch as long as the cover 132 is raised.

The two-way switch $L^5$ within the box normally keeps the wire 111 connected with the wire 110 going to the main terminal $L'$, and thus keeps the automatic controller in operative condition. This switch is kept closed for this purpose by a rod 138 which is pressed down by the cover 132 when closed. As soon as the cover is lifted, however, the spring 139 throws the switch $L^5$ up, and the wire 110 is brought into connection with wires 140 and 131. Since the wire 140 is connected directly to the "end of run" contact 127, the effect of this upward movement of the switch $L^5$ is the same as that resulting from contact between a brush 12 with the terminal 127 during normal operation of the controller 10. Therefore the controller finger 11 returns at once to zero.

At the same time, since the wire 131 is connected to one side of each pair of springs in the group H, the connecting of this wire with $L'$ by the upward movement of the switch $L^5$ makes it possible to close circuit through any one of the valve operating systems $A^1$, $A^2$, etc., by pushing the appropriate button in the group G.

It will thus be seen that, by throwing the switch $L^4$ (thus unlocking the cover 132) and then raising this cover, the switch $L^4$ is locked and the switch $L^5$ acts automatically to return the main controller 10 to zero, and to place in operative condition a group of push buttons G whereby the entire set can be operated manually in accordance with any desired time schedule. Closing of the cover disconnects the manual apparatus, connects the main controller finger 11 to the main terminal $L'$ by wires 111 and 110, and unlocks the shut down switch $L^4$, which can then be returned to normal, in which position it locks the cover 132.

Various changes may be made in this apparatus without departing from the scope of the invention, which is not limited to the details herein shown and described.

What I claim is—

1. In apparatus of the class described, an intermittent actuator therefor and a more rapid continuous actuator therefor, electromagnetic means for shifting from the intermittent to the continuous actuator, a circuit for said means including a special contact member in the controller switch, and automatic means for opening said circuit when the controller switch reaches the normal or zero point.

2. In apparatus of the class described, an electric motor for driving the same, two branch circuits for energizing the same, external means for controlling one of said circuits and a second switch associated with the controller and adapted to be opened automatically when the controller reaches its normal or zero position, whereby, on opening the external branch, the motor will continue to operate the controller until zero position is reached.

3. In apparatus of the class described, a continuous actuator and an intermittent actuator therefor, electromagnetic means for shifting from the intermittent to the continuous actuator, a circuit for said means including an external shut down switch, and automatic means for opening said circuit when the controller switch reaches the normal or zero position.

4. In apparatus of the character described, a plurality of valves, actuating devices for each, and electro-magnetic controlling means for each actuating device; in combination with a main circuit controller in circuit with said electro-magnetic means comprising a dial, contact members carried thereby and arranged in sets upon circles at different distances from the center, a revoluble finger carrying contact members adapted to move over said circles, and motive means for revolving said finger wherein the motive means for the finger comprise a motor, two gear trains driven thereby one of which is arranged for intermittent movement and the other of which is arranged for continuous movement, a shiftable clutch for bringing one or the other of said trains into driving relation with said finger, an electro-magnetic shifting means for said clutch, and means for closing circuit through said shifting means.

5. In apparatus of the character described, a plurality of valves, actuating devices for each, and electro-magnetic controlling means for each actuating device; in combination with a main circuit controller in circuit with said electro-magnetic means comprising a dial, contact members carried thereby and arranged in sets upon circles at different distances from the center, a revoluble finger carrying contact members adapted to move over said circles, and motive means for revolving said finger wherein the motive means for the finger comprise a motor, two gear trains driven thereby one of which is arranged for intermittent movement and the other of which is arranged for continuous movement, a shiftable clutch for bringing one or the other of said trains into driving relation with said finger, an electro-magnetic shifting means for said clutch, and a circuit for said shifting means including a switch adapted to be automatically opened by the controller on reaching zero position.

6. In apparatus of the character described, a plurality of valves, actuating devices for each, and electro-magnetic controlling means for each actuating device; in combination with a main circuit controller in circuit with said electro-magnetic means comprising a dial, contact members carried thereby and arranged in sets upon circles at different distances from the center, a revoluble finger carrying contact members adapted to move over said circles, and motive means for revolving said finger wherein the motive means for the finger comprise a motor, two gear trains driven thereby one of which is arranged for intermittent movement and the other of which is arranged for continuous movement, a shiftable clutch for bringing one or the other of said trains into driving relation with said finger, an electro-magnetic shifting means for said clutch, and a circuit for said shifting means including a special contact member in the controller.

7. In apparatus of the character described, a plurality of valves, actuating devices for each, and electro-magnetic controlling means for each actuating device; in combination with a main circuit controller in circuit with said electro-magnetic means comprising a dial, contact members carried thereby and arranged in sets upon circles at different distances from the center, a revoluble finger carrying contact members adapted to move over said circles, and motive means for revolving said finger wherein the motive means for the finger comprise a motor, two gear trains driven thereby one of which is arranged for intermittent movement and the other of which is arranged for continuous movement, a shiftable clutch for bringing one or the other of said trains into driving relation with said finger, an electro-magnetic shifting means for said clutch, a circuit for said shifting means having two branches one of which includes a switch automatically closed by operation of the shifting means together with a switch adapted to be automatically closed by the controller in zero position, and the other including a special contact in the controller adapted to close the circuit temporarily.

8. In apparatus of the character described, a revoluble motive means adapted to open and close the same alternately by its successive movements, and electro-magnetic controlling means for producing successive limited movements of said motive means for such alternate opening and closing of the valve in combination with a main controller switch comprising an opening contact member and a closing contact member, and means actuated by the motive means for the valve for opening circuit through one of said contact members while preparing a second circuit to be completed when the other of said contact members comes into operation.

9. In apparatus of the character described, a revoluble motive means adapted to open and close the same alternately by its successive movements, and electro-magnetic controlling means for producing successive limited movements of said motive means for such alternate opening and closing of the valve in combination with a main controller switch comprising an opening contact member and a closing contact member, and means actuated by a partial movement of said valve motive means for establishing a circuit through the electro-magnetic controlling means independent of the main controller switch.

10. In apparatus of the class described, a plurality of valves, actuating devices for each, and electro-magnetic controlling means for each actuating device; in combination with a main circuit controller in circuit with said electro-magnetic means, a movable contact member and an "end of run" contact, slow moving and swift moving actuating gears for said controller, a solenoid, means actuated thereby for shifting the controller mechanism from one set of actuating gears to another, an electric circuit including said "end of run" contact and said solenoid and a switch for said circuit actuated by the mechanism which actuates the main controller and adapted to break the solenoid circuit when the controller reaches zero position.

11. Apparatus as in claim 10 wherein the controller actuated gears are driven by an electric motor and wherein the switch includes means for breaking the motor circuit when the main controller reaches zero position.

12. Apparatus as in claim 10 wherein the shifting means actuated by the solenoid includes means for closing a circuit through the solenoid in shunt with the "end of run" contact.

13. Apparatus as in claim 10 comprising a switch (as 55) an operating lever therefor (as 60) means for supporting said lever (as 62) and means for withdrawing said support actuated by the swift moving actuating gears.

14. Apparatus as in claim 10 comprising a switch (as 55) an operating lever therefor (as 60) means for supporting said lever and means for lifting said lever into supported position actuated by the swift moving actuating gears.

15. Apparatus as in claim 10 comprising switch members (as 67) in the circuit of the "end of run" contact and solenoid, and means actuated by the swift moving actuating gears for closing circuit at said switch members.

16. Apparatus as in claim 10 comprising switch members (as 67) in the circuit of the "end of run" contact and solenoid, a shaft driven by said swift moving gears, and an arm on said shaft carrying a conducting member (as 68) adapted to bridge said switch members.

17. Apparatus as in claim 10 comprising switch members (as 67) in the circuit of the "end of run" contact and solenoid, a switch for controlling the solenoid circuit in series with said switch members, a shaft driven by said swift moving gears, an arm on said shaft for closing said first named switch and an arm on said shaft for closing said second named switch.

In testimony whereof I have hereto set my hand on this 23rd day of December, 1922.

JAMES S. KENNEDY.